United States Patent [19]

Yamauchi et al.

[11] Patent Number: 4,936,622
[45] Date of Patent: Jun. 26, 1990

[54] MECHANISM ACTUATING RAIN CHANNEL FOR SUNROOF

[75] Inventors: Takatsugu Yamauchi, Shinjuku; Akira Nishimura, Toyota, both of Japan

[73] Assignee: Toyota Jidosha Kabushiki Kaisha, Japan

[21] Appl. No.: 328,317

[22] Filed: Mar. 24, 1989

[30] Foreign Application Priority Data

Mar. 24, 1988 [JP] Japan ................... 63-38672[U]

[51] Int. Cl.⁵ ..................... B60J 7/05; B60J 7/053
[52] U.S. Cl. ........................... 296/213; 296/221; 296/222; 296/223
[58] Field of Search ............. 296/213, 216, 221-223

[56] References Cited

U.S. PATENT DOCUMENTS

| 3,894,767 | 7/1975 | Schatzler et al. | 296/213 |
| 3,960,404 | 6/1976 | Bienert | 296/213 |
| 3,964,784 | 6/1976 | Prechter et al. | 296/215 |
| 4,085,965 | 4/1978 | Schlapp | 296/213 |
| 4,566,730 | 1/1986 | Knabe et al. | 296/221 |

FOREIGN PATENT DOCUMENTS

| 55-15325 | 4/1980 | Japan . | |
| 60-50020 | 4/1985 | Japan . | |
| 0212126 | 9/1988 | Japan | 296/221 |
| 2207700 | 2/1989 | United Kingdom | 296/221 |

Primary Examiner—Dennis H. Pedder
Attorney, Agent, or Firm—Kenyon & Kenyon

[57] ABSTRACT

A sliding panel which closes an opening formed in an automobile roof can be placed inside the roof to open the opening. A rain channel is located below the rear end of the opening when the opening is closed, to accept incoming water. The channel is placed inside the roof together with the panel. The channel moves relative to the panel in a direction opposite to the direction of movement of the panel inside the roof, for reducing the space needed to accommodate the panel.

20 Claims, 9 Drawing Sheets

MECHANISM ACTUATING RAIN CHANNEL FOR SUNROOF

FIELD OF THE INVENTION

The present invention relates to an automobile sunroof having an opening that can be opened by sliding a part of the roof. That is, the invention relates to a sliding roof structure.

BACKGROUND OF THE INVENTION

In a known tilt-and-sliding sunroof, as well as in a known sliding sunroof, a rain channel is disposed below the edge of the opening in the roof to accept water, as disclosed in Japanese Patent Publication No. 15,325/1980 and Japanese Utility Model Laid-Open No. 50,020/1985. The rain channel is connected to the sliding member of the sliding panel of a sunroof via a ring or the like. The channel is placed inside the roof together with the panel.

This prior art sunroof structure is now described in further detail by referring to FIGS. 9 and 10, where a holder E for a rain channel A is coupled to the guiding rod D of a schematically shown sliding member C by means of a pin F to maintain the positional relation between the rod D and the channel A. When the panel B moves along a guide rail G and arrives at a position in the opening 1 of a roof H, it is directed to a position lying just below the edge J of the opening. In the condition shown in FIG. 9, the panel B has shifted downward from the position at which it was closed. When the panel B is caused to slide into a housing K, the panel is guided toward the rear of the vehicle within the housing K as shown in FIG. 10.

When the sliding panel B is placed in a position below the opening 1, as shown in FIG. 9, the rain channel A for the sunroof is required to catch water droplets falling from the edge J of the opening, water droplets arising from dews formed on the rear surface of a roof rain channel L, other droplets and splashing water. Therefore, the channel is so designed that it is wide enough to cover a given width $W = (W_1 + W_2)$ about the edge J of the opening. Thus, when the panel B is placed into the housing K, the rear edge M of the channel A comes close to the rear wall N of the housing K, limiting the length of the panel B that can be inserted into the housing K. Specifically, the portion of the panel B which can be inserted into the housing K is shortened by the width $W_2$ corresponding to the width of the channel A that extends beyond the rear of the panel B. Consequently, the effective area of the opening 1 is reduced.

SUMMARY OF THE INVENTION

In view of the foregoing, it is an object of the invention to provide a mechanism for actuating a rain channel for a sunroof in such a way that the portion of the opening which is made useless by the channel is reduced to a minimum without impairing the function of the channel.

In accordance with the present invention, a sliding panel for closing the opening in a roof moves along guide rails mounted to the roof to open or close the opening. When the sliding panel is opened, the rain channel disposed below the edge of the opening in the roof is placed inside the roof together with the sliding panel. As the panel slides open, the channel moves relative to the panel to reduce the amount of protrusion of the channel from the panel.

This relative movement can be made at the beginning, the end, or midway of the withdrawing operation of the sliding panel. The portion of the inside of the roof which acts to receive the panel is not required to be large enough to accept the rain channel in addition to the panel. Also, the area of the opening in the roof can be increased, corresponding to the saved space.

When the panel is moved to close the opening in the roof, the rain channel moves relative to the sliding panel so as to protrude from the panel in a reverse relation to the foregoing. Therefore, the rain channel is correctly placed below the edge of the roof opening at which one end of the panel is located. Consequently, the channel will catch incoming rainwater.

DETAILED DESCRIPTION OF THE INVENTION

Figure 1:
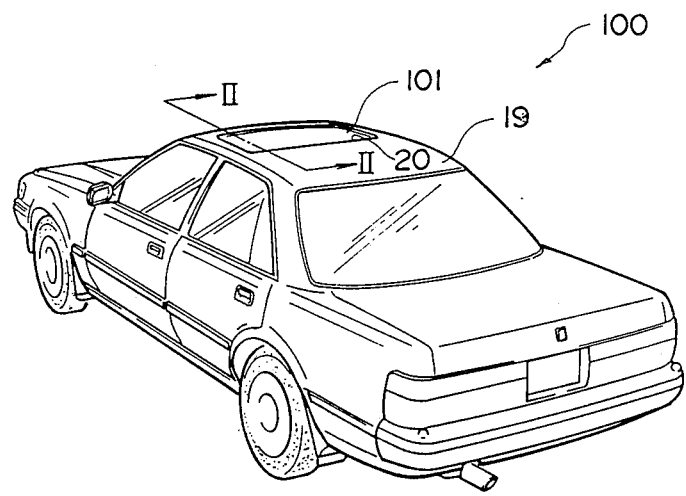
FIG. 1 is a perspective view of a vehicle embodying the invention.
Figure 2:
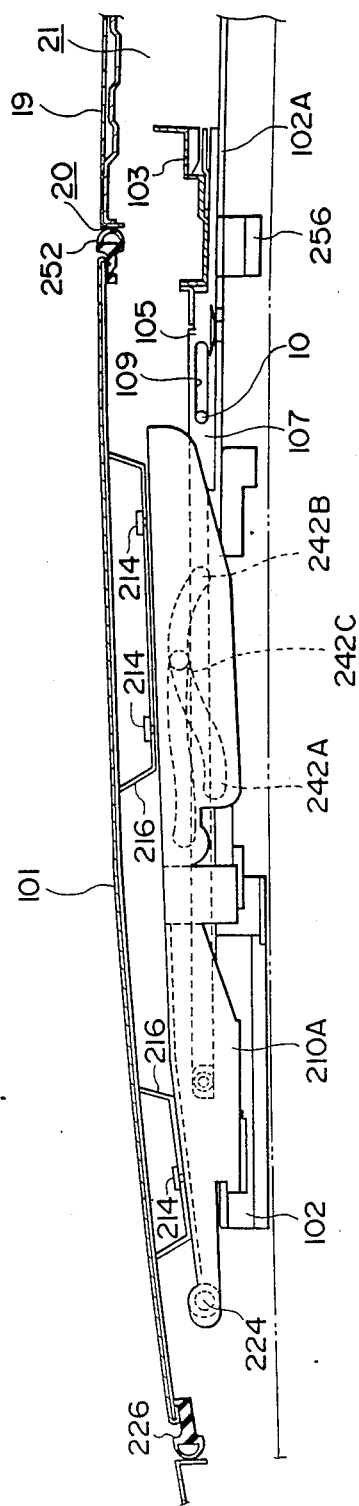
FIG. 2 is a cross-sectional view taken on line II—II of FIG. 1 showing a mechanism driving a sliding panel, the line II—II extending parallel to the longitudinal axis of the vehicle.

Referring to FIG. 1, a vehicle 100 embodying the concept of the present invention has a roof 19 provided with an opening 20 which is closed by a sliding panel 101. As shown in FIG. 2, the outer surface of the panel 101 is substantially flush with the outer surface of the roof 19.

Figure 3:
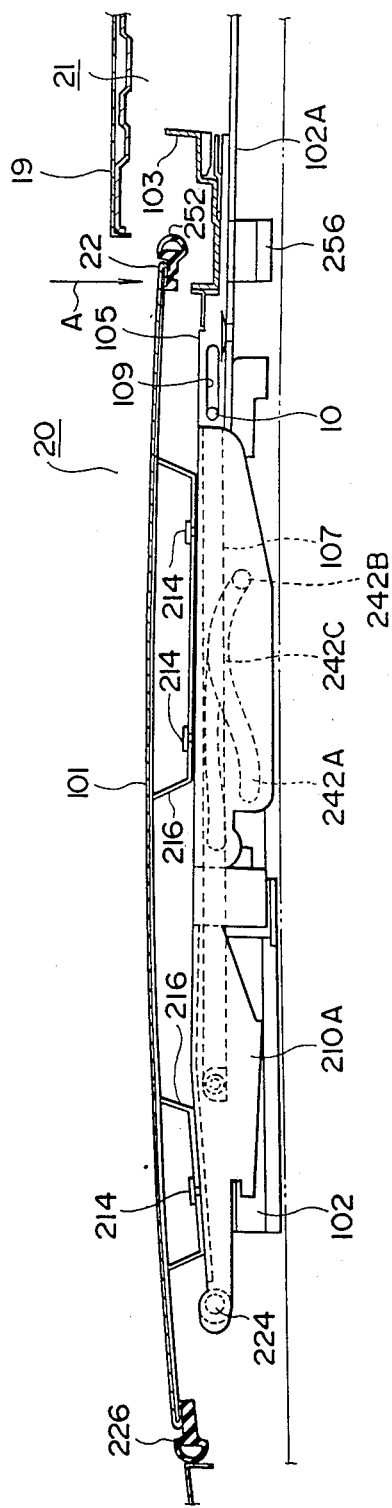
FIG. 3 is a view similar to FIG. 2, but in which the rear end of the sliding panel has moved into a lower position.

As shown in FIG. 3, the end of the sliding panel 101 which is toward the rear of the vehicle drops along the vertical axis of the vehicle as indicated by arrow A. Then, the panel moves toward the rear of the vehicle in the direction indicated by arrow B and is placed in a housing 21 mounted inside the roof 19. As a result, the opening 20 is uncovered, and the inside of the vehicle is placed in communication with the outside through the opening 20. The panel 101 is driven by a shift mechanism shown in FIGS. 6 and 7 to make the above-described movement. A pair of shift mechanisms are disposed in a symmetrical relation with respect to the vertical axis of the vehicle, but only the left shift mechanism is shown in FIGS. 2-8. Referring to FIG. 6, a bracket 210 which holds the panel is provided with longitudinally spaced holes 212. Plates 216 for reinforcing the sliding panel 101 are rigidly fixed in the holes 212 via clips 214 (FIG. 2). Thus, the left half of the panel 101 is supported on the bracket 210, that has a vertically downwardly bent portion 210A at the side which faces the outside of the vehicle. A slot 218 is formed at the front end of the bent portion 210A. The bracket 210 is pivotally mounted to a front shoe 222 by a horizontal pin 224 which is mounted in the slot 218. When the sliding panel 101 tilts, it rotates about the pin 224. The slot 218 permits the sliding panel 101 to move a slight distance longitudinally of the vehicle when the panel 101 is tilted. This prevents a weather strip 226 (FIG. 2) mounted at the front end of the panel 101 from being pressed against the front edge of the opening 20 with an excessive force.

A guide rail 102 extends longitudinally of the vehicle along the opening 20 inside the roof 19. The front shoe 222 can slide longitudinally of the vehicle while guided by the guide rail 102.

A rear shoe 228 is mounted near the rear end of the bracket 210. The rear shoe 228 can move longitudinally of the vehicle while guided by the guide rail 102. One end of a driving cable 232 is connected to the rear shoe 228, while the other end is located toward the front of the vehicle and connected to a driving power source (not shown). When the driving force from the power source is sent to the cable 232, the cable transmits pulling force or compressive force to the rear shoe 228. Then the shoe 228 is moved toward the front or the rear of the vehicle, respectively.

The base portion of a link 236 is pivoted to the rear shoe 228 by a pin 234 extending horizontally. The link 236 extends toward the front of the vehicle. A pin 238 protrudes horizontally from the front end of the inner side surface of the link 236, and is inserted in a guide groove 242 formed in the bent portion 210A of the bracket 210.

A pin 244 protrudes from the outer side surface of the link 236 at a longitudinally intermediate position which is closer to the horizontal pin 238 than the horizontal pin 234. The pin 244 is inserted in a guide groove 248 formed in a guide block 246 that extends longitudinally of the vehicle. Protrusions 246A and 246B which protrude toward the bracket 210 are formed at opposite ends of the block 246. The protrusions 246A, 246B are firmly fixed to the bent portion 210A, so that a space accommodating the link 236 is formed between the central portion of the block 246 and the bent portion 210A.

The guide grooves 242 and 248 extend longitudinally of the vehicle and perpendicularly to the lateral direction indicated by arrow C. The groove 242 is so curved that an intermediate position 242C close to the rear end 242B stands higher than the rear end 242B. Likewise, the groove 248 is curved in such a way that an intermediate position 248C close to its rear end 248B stands higher than its front end 248A. The guide grooves 242 and 248 are disposed so as not to overlap with each other as viewed from a side of the vehicle. Under the condition of FIG. 2, if the rear shoe 228 moves away from the front shoe 222 toward the rear of the vehicle, or in the direction indicated by arrow B (FIG. 6), then the rear end of the sliding panel 101 rotates downwardly about the horizontal pin 224 in the direction indicated by arrow A as shown in FIG. 3. Conversely, if the shoe 228 moves toward the front of the vehicle, the rear end of the panel 101 rotates upwardly about the pin 224 in the direction opposite to the direction indicated by arrow A. The positional relation between the guide grooves 242 and 248 is so set that the panel 101 moves as described above.

As shown in FIG. 2, when the opening 20 is closed by the sliding panel 101, a rain channel 103 is positioned below the rear edge of the opening 20 on which the weather strip 252 bears, to catch inundating water flowing around said edge of the opening. The weather strip 252 is anchored to the rear end of the sliding panel 101. As shown in FIG. 6, the channel 103 is rigidly fixed to a holder 105 by a screw 254. An arm 256 protruding downwardly from the holder 105 can slide longitudinally of the vehicle while guided by a groove 102A formed in the guide rail 102.

A slot 109 extending longitudinally of the vehicle is formed at the front end of the holder 105. A pin 10 is inserted in the slot 109 and is rigidly secured to the rear end of a guide rod 107 which extends longitudinally of the vehicle as shown in FIG. 6. The front end of the rod 107 is firmly affixed to the front shoe 222. Therefore, the rain channel 103 moves longitudinally of the vehicle together with the front shoe 222 and moves a distance equal to the stroke l (FIG. 7) traveled by the pin 10 within the slot 109 relative to the front shoe 222, and hence the sliding panel 101, longitudinally of the vehicle. Consequently, the channel 103 receives the driving force after the panel 101, in the condition shown in FIGS. 3 and 7, moves the distance l toward the rear of the vehicle.

Figure 7:
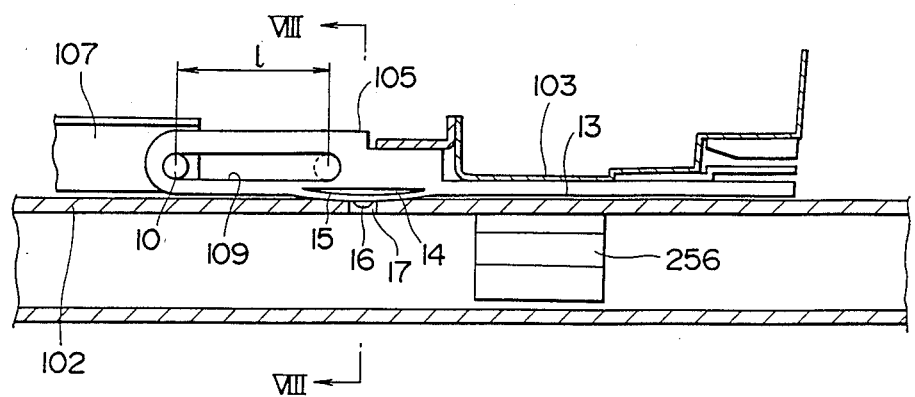
FIG. 7 is a cross-sectional view taken on line VII—VII of FIG. 6, showing a relative shift mechanism constituting a main portion of one example of the invention.
Figure 8:
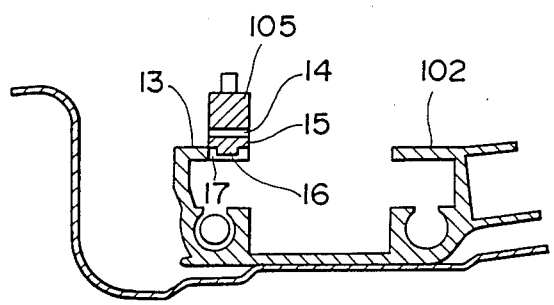
FIG. 8 is a cross-sectional view taken along line VIII—VIII of FIG. 7, showing a rectangular cross section of a guide rail.
Figure 9:
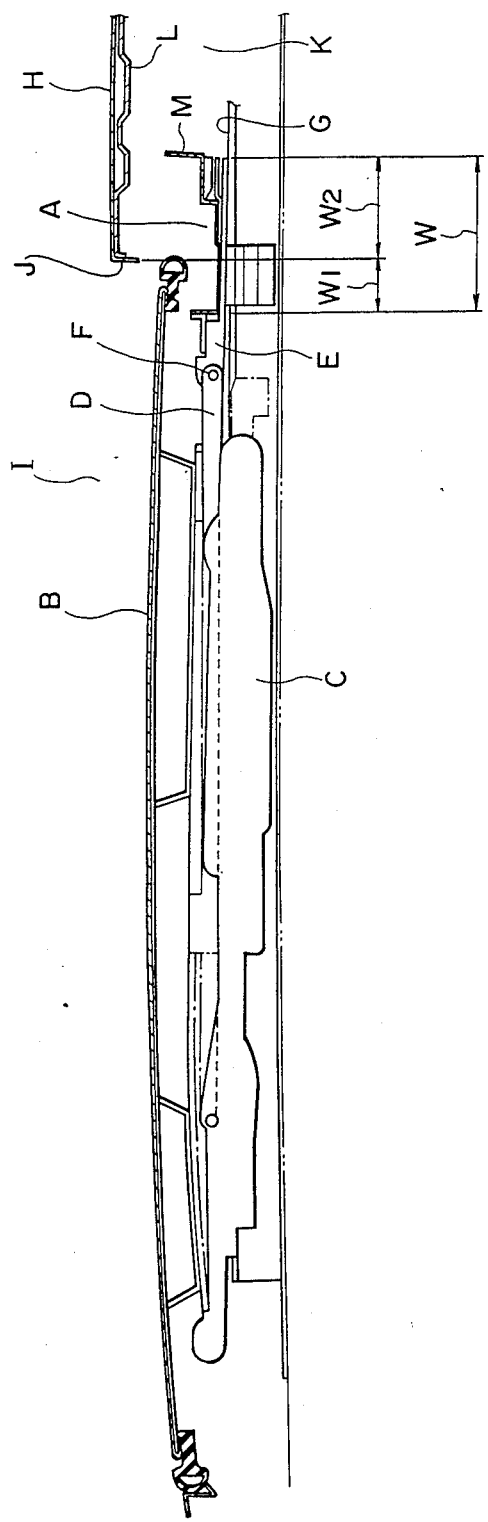
FIG. 9 is a cross-sectional view of a prior art mechanism, corresponding to FIG. 3.
Figure 10:
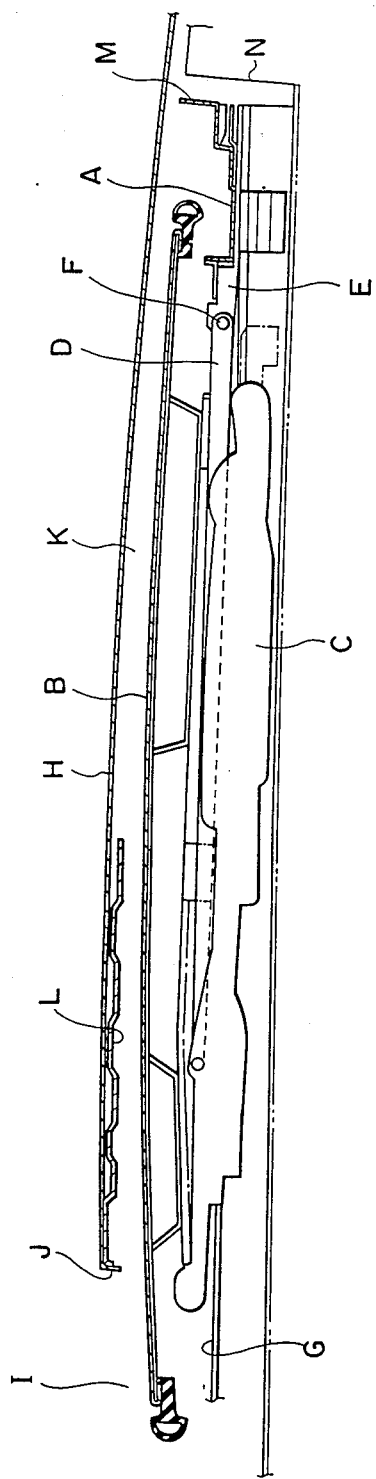
FIG. 10 is a cross-sectional view of the prior art mechanism, corresponding to FIG. 5.

A means for maintaining the holder 105 in the condition shown in FIGS. 2 and 3 is located between the holder 105 and the guide rail 102. As shown in FIGS. 7 and 8, this means comprises a recess 17 formed in the top surface 13 of the rail 102 and a protrusion 16 inserted in the recess 17, the axis of which is vertical. It is not necessary that the recess 17 be a hole extending through the rail; rather it can be a recess formed in the top surface 13.

The protrusion 16 is substantially semicircular in cross section. The protrusion 16 extends downwardly from the central portion of an arm 15. Both ends of the arm 15 are coupled to the holder 105 to form a gap 14 between the arm 15 and the holder 105. Therefore, the protrusion 16 is resiliently pressed into the recess 17 by the arm 15 to form a detent mechanism. Thus, the arm 15 acts to retain the holder 105 and the rain channel 103 in the condition shown in FIG. 7. When the pin 10 collides against the rear end of the slot 109, the arm 15 receives a driving force from the guide rod 107. Then, the arm 15 is resiliently deformed to move the protrusion 16 out of the recess 17.

Figure 5:
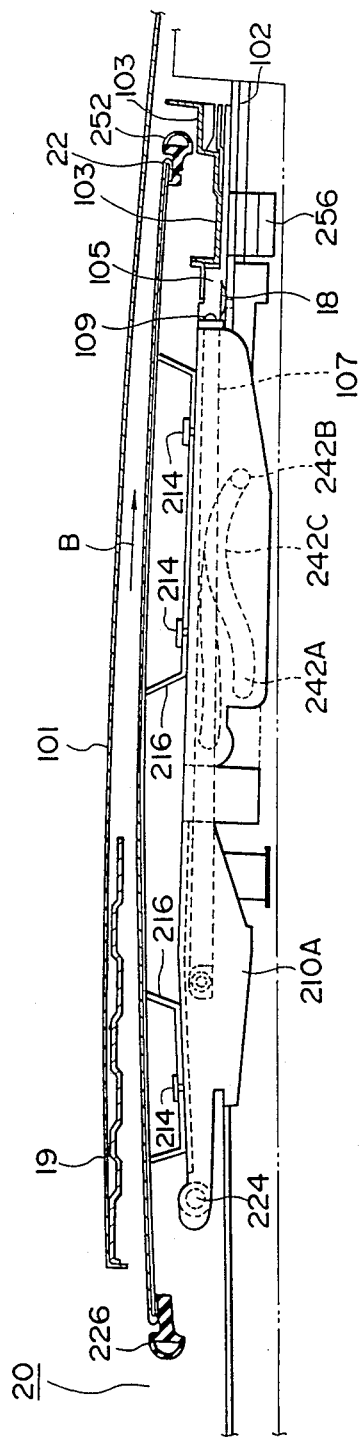
FIG. 5 is a view similar to FIG. 2, but in which the sliding panel is placed inside the roof of the vehicle.
Figure 6:
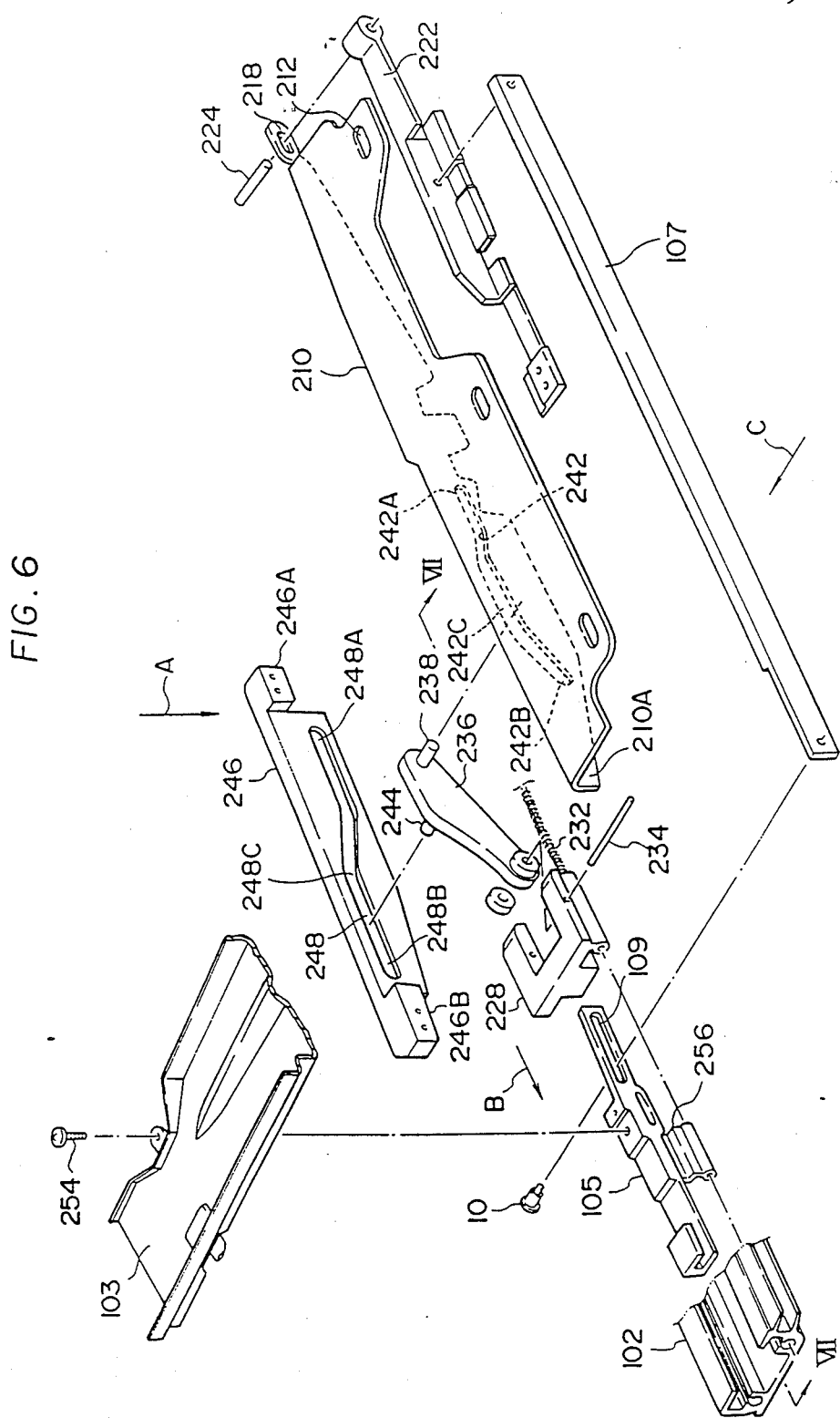
FIG. 6 is an exploded perspective view, looking forward and to the left from above, of the mechanism driving the sliding panel.

As shown in FIG. 5, a hole 18, similar to recess 17, is formed in the guide rail 102 to hold the rain channel 103 when the sliding panel 101 is fully withdrawn in the housing 21, the hole 18 being located near the rear end of the vehicle. This prevents the channel 103 from being inadvertently moved out of position due to vibration of the vehicle or for other cause.

The operation of the mechanism constructed as described above is next described. FIG. 2 shows the condition in which the opening 20 is closed by the sliding panel 101. In this state, the pins 238 and 244 are placed in longitudinally intermediate portions of the guide grooves 242 and 248, respectively. The rain channel 103 is located below the rear edge of the opening 20 on which the weather strip 252 bears, to accept inundating rainwater.

The driving power source (not shown) is activated to move the rear shoe 228 from its home position shown in FIGS. 2 and 7 toward the front of the vehicle. Then, the horizontal pins 238 and 244 are caused to move along the guide grooves 242 and 248, respectively. The bracket 210 supporting the panel is rotated upwardly about the horizontal pin 224. The weather strip 252 moves into a position located above the opening 20 to open the rear portion of the opening 20. When the rear shoe 228 returns to the original condition shown in FIG. 2, the panel 101 again closes the opening. At this time, the holder 105 moves with the rear shoe 228 toward the front of the vehicle. After the condition shown in FIG. 2 has been regained, the holder 105 and the rain channel 103 are kept closer to the front of the vehicle by a distance equal to the stroke 1 traveled by the pin 10 than the original condition shown in FIG. 2. The dimension of the grooves in the rain channel 103 taken longitudinally of the vehicle is made large to make inundating rainwater enter the channel 103 even if the channel stops at a position slightly deviating from the correct position. When the rear shoe 228 returns to its home position so as to incline the sliding panel 101 after the shoe 228 moves toward the front of the vehicle from its home position, the shoe 228 is once moved past its home position toward the rear of the vehicle, i.e., caused to move a distance larger than the stroke 1, and then it is returned to its home position. As a result, the holder 105 also regains the condition shown in FIGS. 2 and 7.

Figure 4:
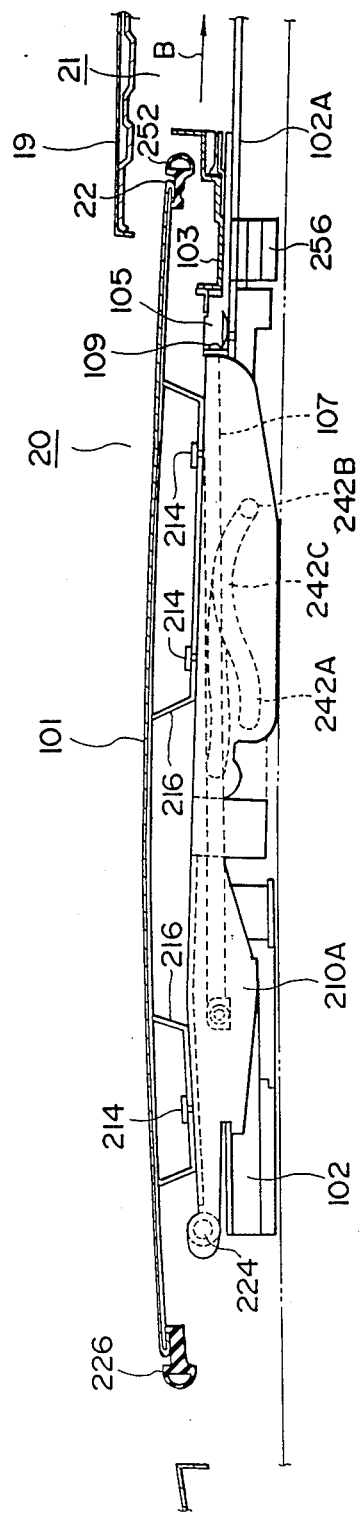
FIG. 4 is a view similar to FIG. 3, but in which the sliding panel is slightly closer to the rear of the vehicle at the beginning of a withdrawing operation.

When the sliding panel 101 is withdrawn into the housing 21, the rear shoe 228 in the condition shown in FIGS. 2 and 7 is driven toward the rear of the vehicle. The horizontal pins 238 and 244 on the link 236 are placed in the rear ends 242B and 248B, respectively, in the guide grooves. This causes the bracket 210 supporting the panel to move the rear end of the panel 101 downwardly as shown in FIG. 3. As a result, the panel 101 is placed in the housing 21 as shown in FIGS. 4 and 5. The holder 105 comes to a halt when the protrusion 16 enters the hole 18. Accordingly, the pin 10 which is moved by the panel 101 and the front shoe 222 longitudinally of the vehicle via the guide rod 107 comes into contact with the rear end of the slot 109 after the panel 101 moves a distance equal to the stroke 1 toward the rear of the vehicle. Then, the rain channel 103 is withdrawn into the housing 21 together with the panel 101. For this reason, the dimensions of the panel 101 and the channel 103 taken longitudinally of the vehicle are reduced by the stroke 1. This can decrease the space in the housing 21 needed to accommodate the channel and the panel. The dimensions of the opening 20 can be increased accordingly.

When the rear shoe 228 is driven toward the front of the vehicle, the pins 238 and 244 on the link 236 move forward in the slots 242 and 248 to the front ends 242A and 248A, respectively, thereby driving the panel 101, the front shoe 222, and the guide rod 107 forward until the pin 10 collides against the front end of the slot 109. Then, the rain channel 103 moves with the sliding panel 101. When the rear shoe 228 returns to the condition shown in FIGS. 2 and 7, the panel 101 again closes the opening 20. Also, the protrusion 16 on the channel 103 is inserted into the recess 17.

In the above example, at the beginning of the withdrawing movement of the sliding panel 101, the rain channel 103 moves relative to the panel 101. Alternatively, at the beginning of the withdrawing movement of the panel 101, the channel 103 is made to move with the panel 101, and they are moved relative to each other near the end or midway of the withdrawing process. To permit the channel 103 and the panel 101 to shift relative to each other, the combination of the pin 10 and the slot 109 is used in the above example. Instead, the channel 103 may be coupled either to the guide rod 107 or to the panel 101 with a compressed coil spring, a chain, or other means.

What is claimed is:

1. A sliding roof structure for an opening formed in a vehicle roof, the opening having front and rear edges and two side edges, said sliding roof structure comprising:
   guide rails extending longitudinally under the roof along the side edges and extending to the rear of the rear edge of the opening in the roof;
   a panel having front and rear ends and two sides, the panel being sized to fit within and sealingly shut the opening in the roof;
   means for mounting the panel on the guide rails for movement between a first position in which the panel shuts the opening in the roof and a second position in which the panel is at least partially retracted under the roof to the rear of the opening in the roof;
   drive means coupled to the panel mounting means for moving the panel between the first position and second position;
   a rain channel having a preselected width dimension and a length dimension, the rain channel extending lengthwise transversely to the guide rails for receiving incoming water flowing between the rear edge of the opening in the roof and the rear end of the panel;
   means for mounting the rain channel adjacent to and below the rear end of the panel; and
   means for coupling the rain channel mounting means to the panel for translating the rain channel parallel to the guide rails in response to sliding movement of the panel along the guide rails,
   the coupling means including a relative shift mechanism which permits movement of the rain channel relative to the panel for a predetermined distance from a first condition in which a major portion of the width dimension of the rain channel extends rearwardly of the rear end of the panel to a second condition in which a major portion of the width dimension of the rain channel is located in front of the rear end of the panel, whereby the space under the roof needed to accommodate the panel in the second position is reduced when the rain channel is in the second condition relative to the panel.

2. The sliding roof structure of claim 1, wherein the rain channel mounting means comprises means for moving the rain channel from the first condition to the second condition relative to the panel when the panel is moved from the first position to the second position.

3. The sliding roof structure of claim 1, wherein the rain channel mounting means comprises a holding means for preventing the rain channel from moving relative to the guide rails, when the panel is in the first position and the rain channel is in the first condition relative to the panel, in response to movement of the panel toward the second position until the sliding panel moves said predetermined distance, whereby the channel moves relative to the panel from the first condition to the second condition.

4. The sliding roof structure of claim 3, wherein said holding means comprises a detent mechanism which maintains the rain channel stationary on the guide rails until a given driving force acts on the rain channel mounting means in a direction parallel to the guide rails.

5. The sliding roof structure of claim 4, wherein said detent mechanism comprises a protrusion mounted on one of the rain channel mounting means and the guide rails, a complementary recess on the other of the rain channel mounting means and the guide rails, and biasing means for pressing the protrusion into the recess with a given biasing force, and wherein said driving force brings the protrusion out of the recess to permit the rain channel to move in response to movement of the sliding panel.

6. The sliding roof structure of claim 1, wherein the rain channel mounting means comprises a holder and said relative shift mechanism comprises one of said coupling means and said holder having a slot extending in the direction of the guide rails and the other having a pin that is received in the slot, and the length of the slot being equal to said predetermined distance, whereby movement of the pin in the slot causes the rain channel to move relative to the panel in a direction parallel to the guide rails.

7. The sliding roof structure of claim 6, wherein said holder comprises a protrusion and means for pressing the protrusion into a recess in one of the guide rails, the recess being located to mate with the protrusion when the the panel is in the first position and the rain channel is in the first condition relative to the panel, and wherein the pressing means holds the protrusion in the recess until the panel moves from the first position toward the second position by the predetermined distance, thereby causing the channel to move relative to the panel.

8. The sliding roof structure of claim 1, wherein said sliding panel mounting means comprises:
(a) a front shoe and a rear shoe which are mounted adjacent to the front of the panel and adjacent to the rear of the panel, respectively, and are movable along one of the guide rails, the rear shoe being connected to the driving means;
(b) means mounted on the rear shoe for raising and lowering the rear end of the panel in response to frontward and rearward forces, respectively, applied by the drive means to the rear shoe; and
(c) the coupling means couples the rain channel mounting means to the front shoe.

9. The sliding roof structure of claim 8, wherein the rain channel mounting means comprises a holder, and the relative shift mechanism comprises one of the holder and the front shoe having a slot extending in the direction of the guide rails and the coupling means having a pin inserted in the slot and movable longitudinally along the slot between a front end and a rear end of the slot, whereby the rain channel and the front shoe can move relative to each other by a distance equal to the length of the slot.

10. The sliding roof structure of claim 9, wherein the rain channel is fixed to said holder, and wherein the the coupling means comprises a guide rod extending from the front shoe to the holder, the pin being mounted on said guide rod.

11. The sliding roof structure of claim 10, wherein the rain channel mounting means further comprises a holding mechanism for preventing relative movement between the holder and the guide rails in response to rearward movement of the sliding panel from the first position until the pin mounted on the guide rod contacts the rear end of the slot.

12. The sliding roof structure of claim 11, wherein said holding mechanism comprises a detent means for maintaining the holder fixed to the guide rails until the holder receives a rearward driving force from the drive means via the rear shoe, the panel, the front shoe, and the guide rod.

13. The sliding roof structure of claim 8, wherein the coupling means is mounted between the the rain channel mounting means and the front shoe, and the relative shift mechanism comprises a lost motion mechanism having a play equal to said predetermined distance.

14. The sliding roof structure of claim 13, wherein said lost motion mechanism permits transmission of a driving force from the front shoe to the rain channel mounting means in either direction after takeup of the play of the lost motion mechanism.

15. A sliding roof structure for an opening formed in a roof of an automobile to place the inside of the automobile in communication with the outside via the opening, said sliding roof structure comprising:
guide rails extending alongside the opening and under the roof longitudinally of the automobile;
a sliding panel having a front portion, a rear portion, and two sides, the panel being sized to fit within and sealingly shut the opening in the roof;
a front shoe mounted for movement along the guide rails and to which the front portion of the sliding panel is pivotally mounted;
a rear shoe mounted for movement along the guide rails;
means for supporting the rear portion of the sliding panel for relative vertical movement with respect to the rear shoe, such that when the rear shoe is moved toward the front shoe, the supporting means raises and inclines the panel, and when the rear shoe is moved away from the front shoe, the supporting means lowers the panel so that the panel can be inserted rearwardly under the roof;
a rain channel located below the rear portion of the panel and extending a substantial distance to the rear of the panel when the panel shuts the opening in the roof; and
a rain channel coupling mechanism which couples the rain channel to the front shoe and which, when the sliding panel is inserted rearwardly under the roof, permits the rain channel to move forwardly with respect to the panel by a distance equal to at least a substantial portion of the width of the rain channel to reduce the longitudinal space under the roof needed to accommodate the panel.

16. The sliding roof structure of claim 15, wherein the coupling mechanism comprises a guide rod having a front end supported on the front shoe, the rod extending toward the rear of the automobile.

17. The sliding roof structure of claim 16, wherein the rain channel comprises a holder having an elongated slot extending in the extension direction of the guide rails, and wherein a pin protruding from the guide rod is inserted in the slot to permit the rain channel and the front shoe to move relative to each other when the pin is intermediate the ends of the slot.

18. The sliding roof structure of claim 17, wherein the holder comprises frictional engagement means for preventing the holder from being inadvertently moved relative to the guide rails when the rain channel and the front shoe can move relative to each other.

19. The sliding roof structure of claim 18, wherein said frictional engagement means comprises a detent means having a protrusion urged to protrude from the holder and to enter recesses in one of the guide rails, and wherein the protrusion is disengageable from the recesses in response to a driving force received from the front shoe via the guide rod after the pin contacts the end of the slot in the direction of the driving force, to permit the rain channel to move with the front shoe along the guide rails in the direction of the driving force.

20. A sliding roof structure comprising:
   a pair of parallel spaced apart guide rails;
   a sliding panel having a front end and a rear end;
   a front slide mechanism for supporting the front of the sliding panel on the guide rails for movement along the guide rails and for pivotal movement about an axis transverse to the guide rails;
   a rain channel extending transversely to the guide rails, the rain channel having a preselected width dimension;
   a holder fastened to the rain channel for supporting the rain channel and for mounting the rain channel on the guide rails for movement along the guide rails; and
   a linking device coupling the front slide mechanism to the holder, the linking device comprising a lost motion mechanism for permitting movement of the holder along the guide rails relative to the front slide mechanism through a predetermined distance equal to at least a significant portion of the width dimension of the rain channel, such that the rain channel is movable relative to the sliding panel along the guide rails for a distance equal to said predetermined distance.

* * * * *